United States Patent [19]
Swezey

[11] 3,796,019
[45] Mar. 12, 1974

[54] PROCESS AND APPARATUS FOR FORMING DISPLAY PACKAGES

[75] Inventor: Edwin Whitney Swezey, Hackensack, N.J.

[73] Assignee: Union Camp Corporation, Wayne Township, N.J.

[22] Filed: Apr. 21, 1972

[21] Appl. No.: 246,429

Related U.S. Application Data
[63] Continuation-in-part of Ser. No. 862,586, Aug. 25, 1969, Pat. No. 3,657,855.

[52] U.S. Cl............................. 53/3, 53/29, 53/128, 53/184, 53/196, 205/80 A, 156/514, 156/500
[51] Int. Cl............................................. B65b 11/50
[58] Field of Search............ 53/3, 29, 184, 30, 128, 53/183, 196, 389; 206/80 A; 156/500, 514, 583

[56] References Cited
UNITED STATES PATENTS

| | | | |
|---|---|---|---|
| 3,657,855 | 4/1972 | Swezey | 53/3 |
| 3,286,835 | 11/1966 | Crane, Jr. | 53/184 X |
| 3,540,583 | 11/1970 | Tomlinson | 206/80 A |
| 3,470,675 | 10/1969 | Crane, Jr. | 53/196 X |
| 3,534,524 | 10/1970 | Swezey | 53/184 X |

Primary Examiner—Andrew R. Juhasz
Assistant Examiner—W. D. Bray
Attorney, Agent, or Firm—Charles P. Bauer

[57] ABSTRACT

The article is further secured in the display device by a layer of suitable flexible material affixed to the underside of the transparent film and located across the aperture and open side of the loop.

7 Claims, 13 Drawing Figures

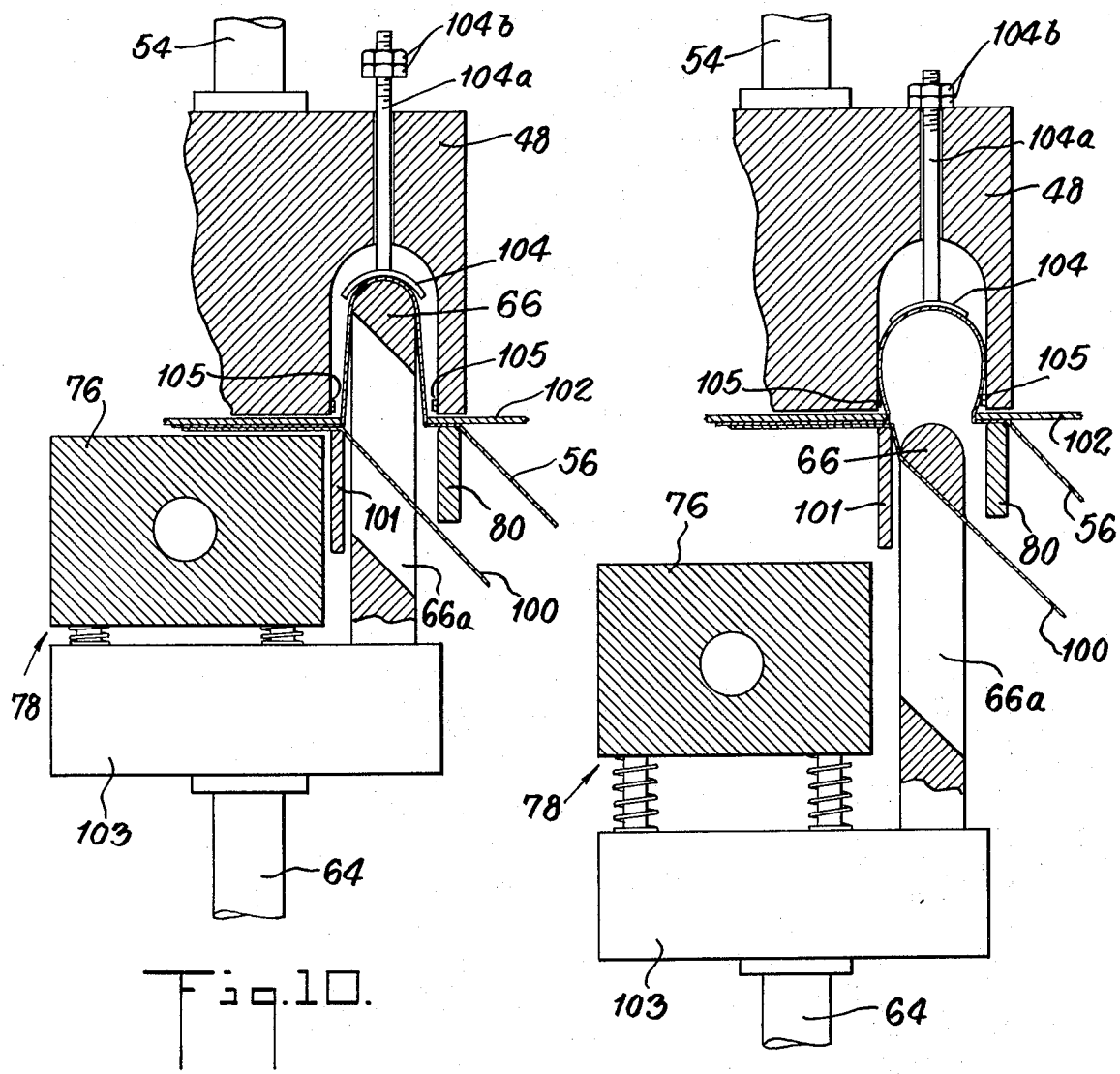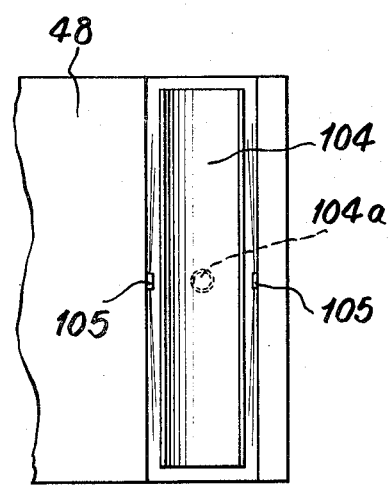

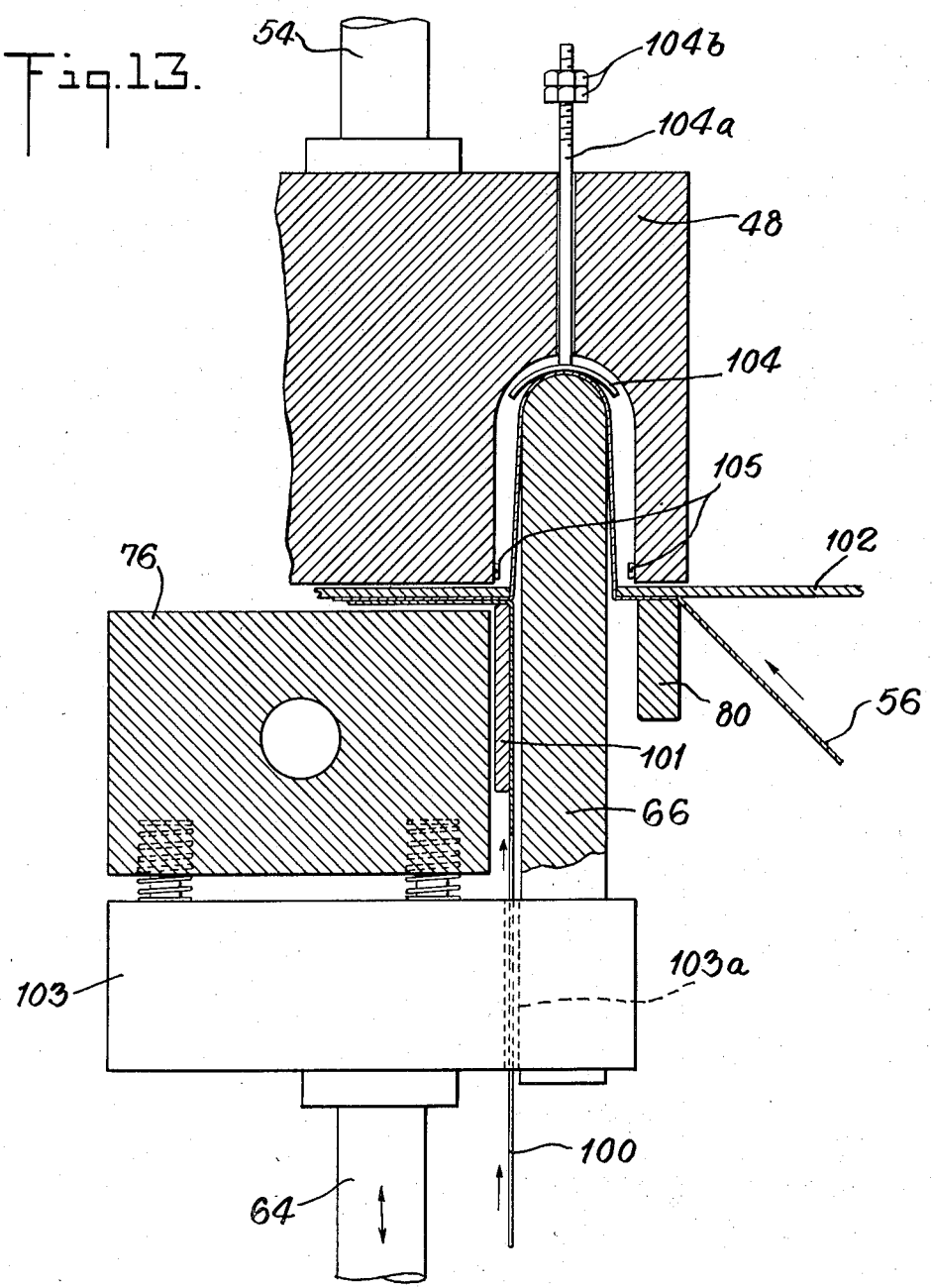

PROCESS AND APPARATUS FOR FORMING DISPLAY PACKAGES

This application is a continuation-in-part of my application Ser. No. 862,586 filed Aug. 25, 1969 (U.S. Pat. No. 3,657,855).

This invention relates to a process for the preparation of a new article of manufacture and to machinery and equipment for the manufacture thereof.

Particularly the invention relates to a display package of one or more items wherein the items are displayed on the face side of a sheet of flexible material, such as a display card. The flexible material is provided with apertures of the general configuration of the display item but of a reduced size. The displayed items are held firmly in position in the sized apertures by a loop of flexible film which extends upwardly through the apertures mechanically tightened around the item and affixed to the back of the sheet of flexible material on each side of the aperture.

The art is familiar with display packages wherein the item to be displayed is firmly held in position by means of a thermoplastic heat-shrinkable film. One commercially available process for accomplishing this objective is the "Stretch-Pak" process in which the displayed article is sandwiched between two layers of a thermoplastic heat shrinkable film, the article normally appearing in a pocket formed in a display device. This display packaged has had considerable commercial success and is normally to be seen in any consumer outlet.

There has also been described to the art display packages which comprise a display card having an aperture therein which is formed by extending through the aperture a loop of a thermosplastic heat shrinkable film, inserting the article to be displayed in the loop so formed and then heat shrinking the loop about the article to fasten it securely to the display card. In this instance the heat shrinkable film is fastened to the rear side of the display card by adhesive means and the loop is formed through the aperture in the card by heating the thermoplastic film and force stretching it while heated to form a loop of the desired size, that is, one which will accommodate the item to be displayed. The item is then inserted into the stretched loop which is formed in the film and tightened by a second heating operation.

These prior art processes have the obvious disadvantage of requiring the application of an adhesive to the back of the card, a heating step to stretch or extend the heat shrinkable thermoplastic film to form an expanded film about the article to be displayed. In addition to these mechanical disadvantages, all of which are time-consuming and therefore expensive, the cost of the thermoplastic heat shrinkable film in large volume production operations is considerably higher than that of the ordinary transparent films which are available commercially.

The instant invention overcomes the objections attendant on the process described above in that ordinary transparent film is used and the necessity for the expanding and heat shrinking steps described above is eliminated.

Accordingly, one object of the invention is to provide an improved display package which can be automatically manufactured in a continuous manner.

A further object of the invention is to provide an improved display package of one or more items and which utilizes a continuous flow of a flexible material of a single thickness and a transparent film which need not be shrinkable as is required by many such display packages but which is mechanically tightened about the article for holding it firmly in position.

Another object of the invention is to provide an apparatus which automatically develops a display package of one or more items of irregular shape from a continuous supply of flexible material, transparent film, and items.

A still further object of the invention is to provide an apparatus which is continuous and is automatically sequentially cycled for forming said display card.

Another object of the invention is to provide an apparatus which automatically develops a display package containing one or more items from a continuous web of flexible material, a continuous web of transparent film and a supply of items to be packaged.

Another object of the invention is to provide a display package containing one or more items from a continuous web of flexible material, a continuous web of a non-heat shrinkable transparent film and a supply of items to be packaged.

A further object of the instant invention is to provide a process wherein the web of transparent film is tightened about the item to be displayed by mechanical means without the necessity of resorting to an expensive and time-consuming heating step to heat shrink a film about the item.

Another object of the invention is to provide a process and apparatus which is adapted to automatically develop a display package from a continuous web of flexible material, a continuous web of a transparent non-heat shrinkable film material and a supply of items to be packaged wherein the transparent film is mechanically tightened about the object to be packaged in a continuous manner by mechanical means and a heat sealed to the back of the flexible material while in the tightened position without the use of extensive application of adhesives.

A further object is to provide apparatus which will affix to the back side of the display package a tape or web of material over the transparent film and the article, which web of material will further secure the article to the sheet of flexible material.

Other and further features and advantages attributable to the instant inventive concept will appear as the description proceeds.

The inventive concept will be more clearly explained by referring to the accompanying drawings in which similar reference numerals are utilized to designate like components in the several views.

In the drawings:

FIG. 10 is a sectional view similar to FIG. 8 showing the feeding of the backing tape through the loop forming means to the film with the loop forming means projected into the die cavity;

FIG. 11 is a sectional view similar to FIGS. 8 and 10 showing the loop forming means retracted from the die cavity, the loop shaper and the air jets which assist in the loop formation;

FIG. 12 is a bottom plan view of the upper die showing said shaper and air jets; and FIG. 13 is a sectional view similar to FIG. 8 with a modified means for feeding the backing tape to the film.

Figure 1:
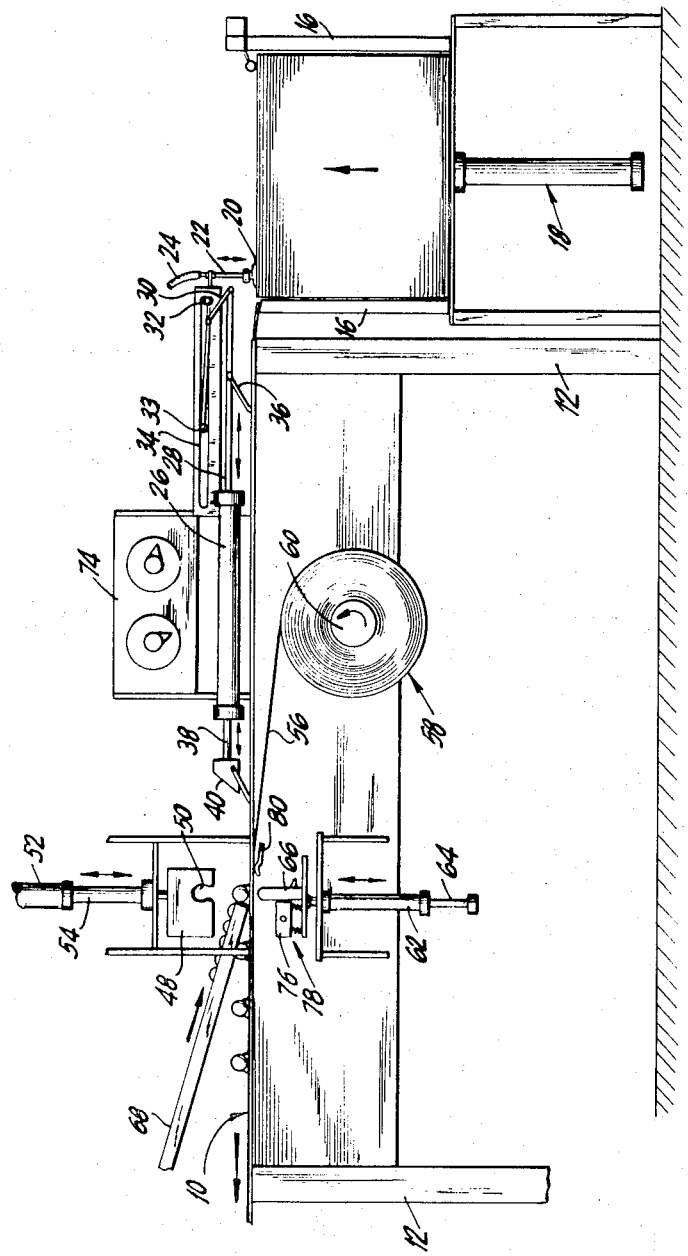
FIG. 1 is a side elevational view of the apparatus of one embodiment of the invention.
Figure 2:
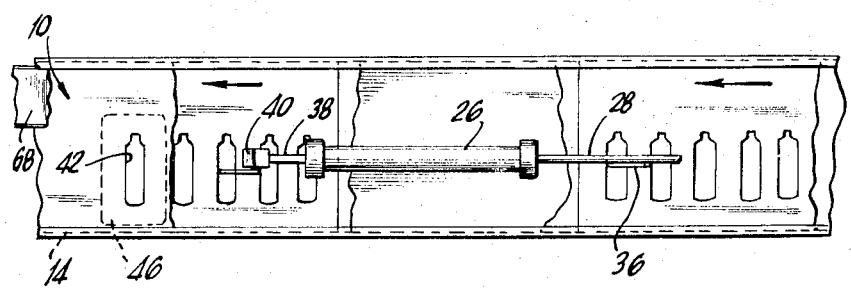
FIG. 2 is a fragmentary top plan view of the apparatus of FIG. 1.

In general, the operating sequence of the apparatus of this invention involves a cyclic action, the cycles being sequential and simultaneously controlled by a timing mechanism. During the first cycle of operation an aperture in a sheet of flexible material, such as a single thickness apertured display card, is placed in register in the apparatus, a die containing a loop receiving cavity is positioned over the aperture in the card, and a loop of a transparent film is formed through the aperture in the card of flexible material and in the die cavity. During the second cycle the loop-forming means is withdrawn, a blast of air from the loop forming means causes the film to conform to the die cavity, leaving the loop formed in the die and through the aperture in the flexible card, an item to be packaged is positioned in the loop so formed, the means for placing the aperture in the card in registration with the loop-forming means is retracted and the loop receiving die is retracted.

The first cycle is then repeated, the registration means tightening the transparent film about the article just positioned in the loop of the film.

Concurrently with the formation of the loop by the loop forming means, the transparent film is affixed to the back of the sheet of flexible material, or card, by affixing means, such as heat sealing means or the like.

If desired, punch means may be installed after the product insertion step to sever the package as desired.

Thus, after a series of sequentially operated cycles a display package containing one or more items in display thereon is continuously and automatically formed.

Turning now to the drawings, reference numeral 10 indicates a table or platform supported by legs 12 and adapted to receive and guide along its upper surface a sheet of flexible material such as rectangular cards. The cards are sequentially positioned along the upper surface of table 10 by propelling or registering device, hereinafter described, and are positioned on table 10 by guiding means shown in this particular embodiment as grooved recesses 14.

In the embodiment illustrated in FIG. 1, a supply of rectangular sheets of a flexible material are stored in magazine 16 which is adapted to the shape of the sheets and equipped with a follower mechanism 18 to move the stack of cards upwards in the magazine as they are sequentially removed from the top.

Figure 6:
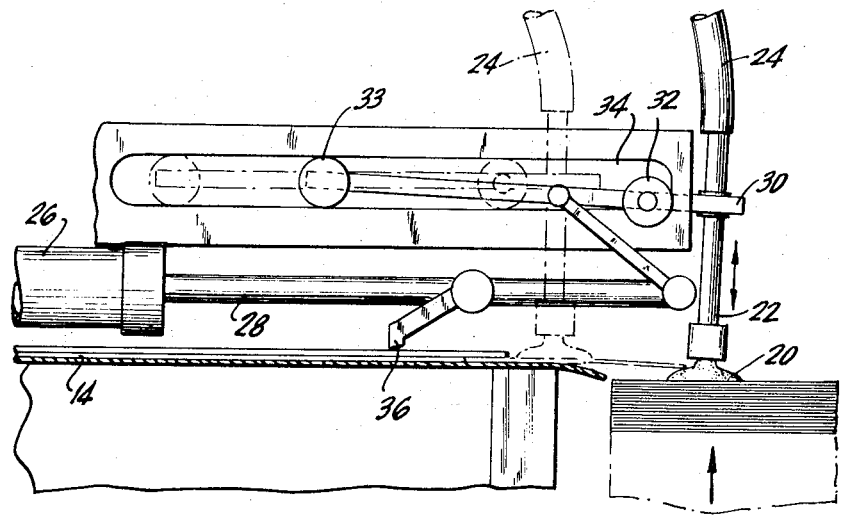
FIG. 6 is a fragmentary side elevational view of one embodiment of the invention showing a card handling apparatus operating upon a vacuum principle.

A transporting mechanism sequentially removes the top sheet of flexible material from magazine 16 and positions it on table 10. This transporting mechanism is shown in detail in FIG. 6 and comprises, in one embodiment of the invention, a vacuum cup 20 which is connected by a hollow rod member 22 and flexible hose 24 to a vacuum source not shown. The positioning of a sheet of flexible material from magazine 16 to the table 10 is shown by the dotted lines in FIG. 6.

A double reciprocating piston 26 sequentially operates to advance the sheets of flexible material along table top 10 and to actuate the vacuum device for transferring cards to the table. Reciprocating rod 28 is movably connected to hollow rod member 22 by a lever 30. Adapted on lever 30 are lugs or projections 32 and 33 which operate on a cammed surface 34. The camming arrangement is such that when piston 28 is extended, that is, moves to the right of FIG. 1, the vacuum positioning cup 20 is lowered and makes contact with the top sheet of the flexible material in magazine 16. As piston 28 is retracted, that is, moves to the left of FIG. 1, the camming action raises the sheet of flexible material picked up by vacuum cup 20 and is moved to the left and positioned on table 10 in grooved recesses 14. The timing mechanism controls the application of vacuum to vacuum cup 20 such that vacuum is applied when piston 28 is fully extended and maintained until it is completely retracted and the sheet of flexible material is properly positioned in grooved recesses 14 on table 10.

Concurrently with the retraction of piston 28 a ratcheted feeding member 36 enters an aperture of the sheet of flexible material and slides the sheet along the top of table 10 in the grooved recesses 14.

Synchronized with the movement of piston 28 by cylinder 26 is piston 38. At the end of piston 38 is a ratcheted projection 40 which is similar to projection 36 and serves to advance the sheets of flexible material along the top of table 10 in guiding recesses 14. The stroke of cylinder 26 and pistons 28 and 38 are adjusted such that each operation brings into registration an aperture in the sheet of flexible material and an aperture 42 in table 10.

Aperture 42 is formed in an aperture plate 46 which is fixed by screw means not shown in table 10. This arrangement is provided so that apertures of a different size may be fitted in the recesses in table 10 to accommodate articles of a different size and shape.

Positioned above aperture 42 of table 10 is a die 48 which is equipped with a cavity 50 adapted to conform generally to the configuration of the article being packaged. Die 48 is actuated by cylinder 52 and piston 54. When the piston 54 is extended die 48 and cavity 50 are positioned directly above aperture 42 of table 10 and in registration with an aperture of the sheet of flexible material.

Positioned below the surface of table 10 is a continuous web of a transparent film 56 which is withdrawn from a roll 58 operating on spindle 60. The web of transparent film 56 passes beneath the undersurface of the sheet of flexible material and is attached to said sheet as will be more completely explained hereinafter. At the beginning of the operation film 56 may be manually fixed to the underside of the sheet of flexible material as by taping or stapling thereto.

Positioned directly below aperture 42 is loop-forming means which comprises a cylinder 62 operating a reciprocated piston 64. Attached to the upper end of piston 64 is a plunger 66 which is shaped to conform generally to the configuration of the article being packaged.

Figure 3:
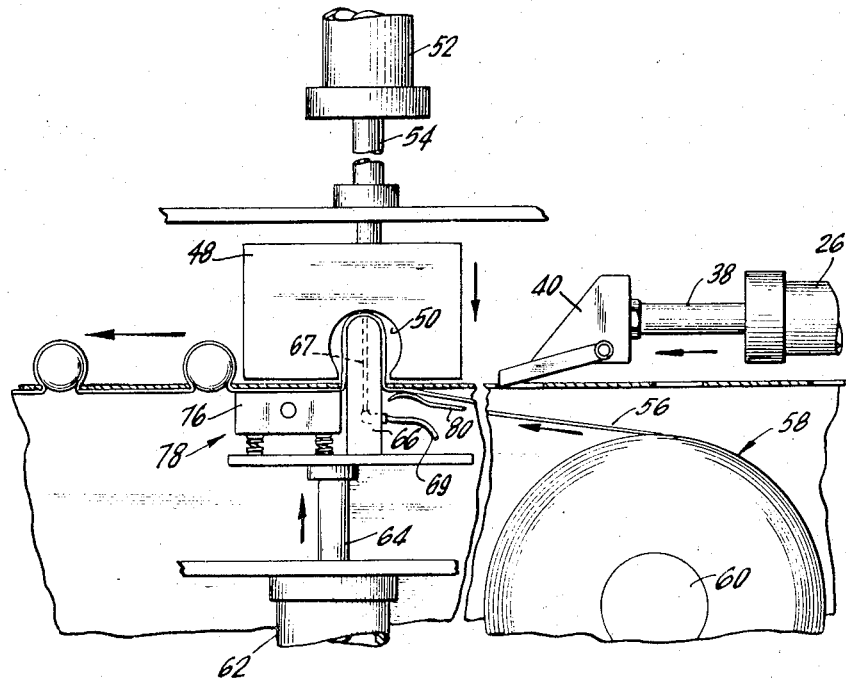
FIG. 3 is a fragmentary view of one portion of the apparatus of FIG. 1 showing in more detail the loop-forming means during the loop-forming cycle with cards in section.

When piston 64 is extended, loop-forming means 66 is projected through aperture 42 of table 10 and into die cavity 50 carrying with it the web of transparent film 56 and forming a loop thereof as is shown in detail in FIG. 3.

Loop forming means 66 may be provided with one or more chambers, 67, therein connected at the lower end thereof with tube 69 which is in turn connected to a compressed air source, not shown.

When piston 64 is retracted the loop forming plunger 66 is withdrawn and the loop of the transparent film remains in die cavity 50. The loop is held in place and caused to conform to die cavity 50 by a blast of air from air chamber 67.

Figure 5:
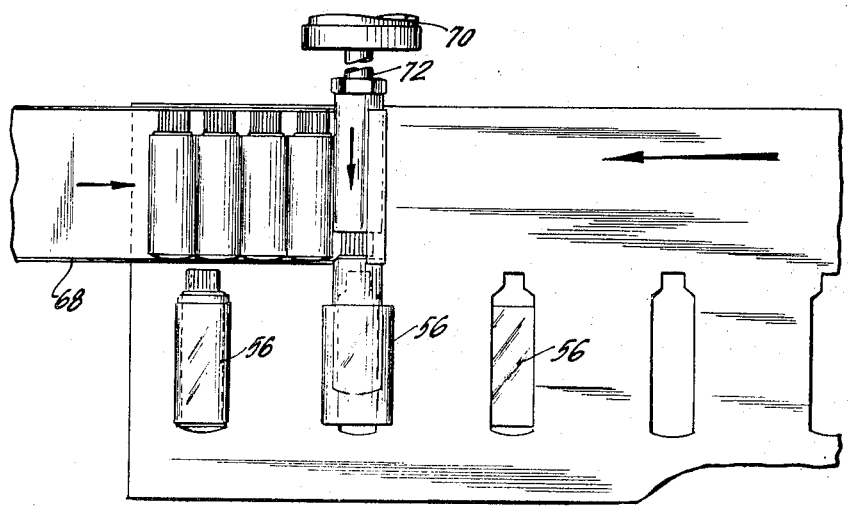
FIG. 5 is a fragmentary top plan view of a portion of the apparatus during the product insertion cycle.

A plurality of articles to be packaged is maintained in magazine means 68 which is so arranged that the articles are delivered sequentially to a position adjacent to the opening in the loop of the transparent film material as is shown in more detail in FIG. 5.

Product positioning means which comprises an adjustable stroke cylinder 70 which actuates a piston 72 is so positioned such that when the piston is extended a product is inserted horizontally in the loop of transparent film material positioned within the die cavity 50 of die 48. The adjustable stroke cylinder 70 is also sequentially timed by a timing device 74 shown in FIG. 1.

In the embodiment shown in FIG. 1 piston 64, which actuates the loop forming plunger 66, also actuates heat sealing platen 76. Platen 76 is equipped with heating means such as a heating element 78 and is brought to the proper temperature by said heating element. When piston 64 is in its extended position the hot platen 76 makes contact with the web of transparent film 56 and the underneath side of the flexible material on table 10. This contact heat seals the film to the underneath side of the flexible material and firmly affixes it thereto. Film tensioning means which is adjustable with respect to the amount of tension placed on transparent film web 56 is positioned as shown at 80 to place the web of transparent film under the desired tension.

It will be appreciated that other fastening means such as stapling, adhesion, and the like may be used to fasten the film to the flexible material.

The continuous web of the film of transparent material which is utilized to hold the items in the display package is severed between individual display cards by means of a cutting mechanism. This cutting mechanism illustrated in FIG. 4 hereof comprises a cylinder 82 which actuates piston 84 and cut-off knife 86. Cylinder 82 is connected by means not shown to time device 74 so that it operates on a sequence impulse from the timing device.

Figure 4:
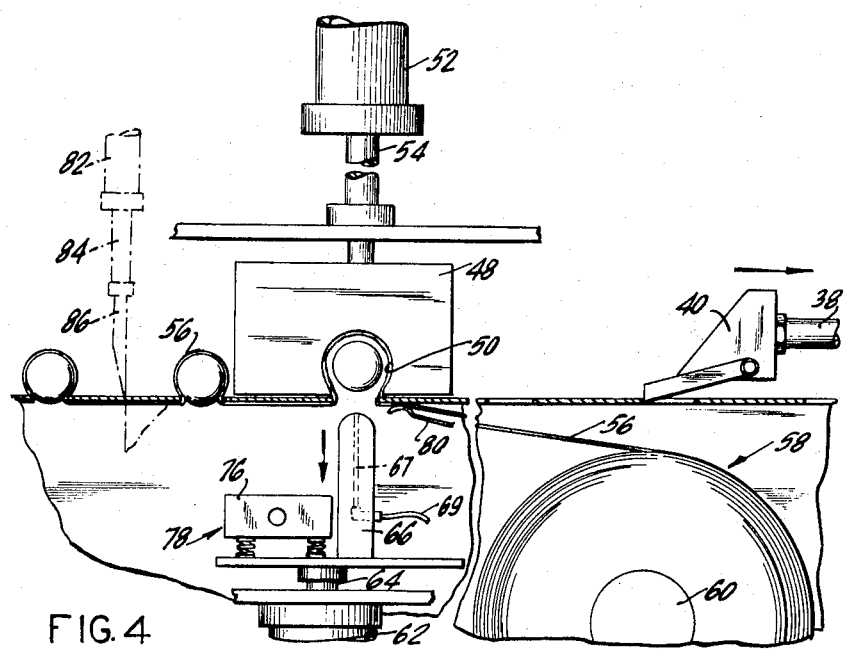
FIG. 4 is a fragmentary view, comparable to that of FIG. 3, showing the apparatus after completion of the product insertion cycle.

In operation, therefore, starting from positions shown in FIG. 4 in which the product has just been positioned within the loop of transparent film in die cavity 50 of die 48, cylinder 52 operates to retract piston rod 54 and die 48. Sequentially cylinder 26 operates to extend piston 38 and to place the next aperture in the sheet of flexible material in registration with aperture 42 of table 10 by means of ratcheted projection 40.

Simultaneous with the extension of piston 38, piston 28 is retracted and another sheet of flexible material is deposited on the upper surface of table 10 by means of vacuum cup 20, lever arm 30, lugs 32 and 33 and the cam action of cam 34.

Sequentially piston 54 is extended by adjustable stroke cylinder 52 positioning die 48 and die cavity 50 immediately above aperture 42 of table 10 and in registration with an aperture in the sheet of flexible material. When die 48 is in position, piston 64 is extended by hydraulic cylinder 62 and the loop forming projection 66 forms a loop of the web of transparent film 56 in die cavity 50. A blast of air from air duct 67 causes the loop to conform to die cavity 50 and holds it in position. Concurrently therewith heating platen 76 seals the web of transparent film to the underside of the sheet of flexible material immediately behind the next preceding aperture.

Cylinder 62 then retracts piston 64 and adjustable cylinder 70 extends piston 72 placing the next positioned article from magazine 68 in the loop of transparent film within die cavity 50. Piston 72 is then retracted by cylinder 70. Piston 54 is retracted by cylinder 52 and cylinder 26 is actuated moving into registration the next succeeding aperture in the sheet of flexible material. Concurrently with this advance the web of transparent film is tightened around the article just positioned within the last loop formed and is held in the tightened position by tension means 80 until the film is sequentially sealed into position on the backside of the sheet of flexible material by heating platen 76.

As was stated above the various cycles and movements of this invention are sequentially timed by timer 74 so that the complete operation is continuous and automatic.

Figure 7:
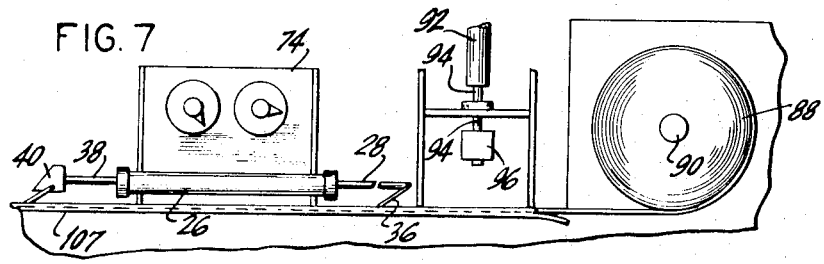
FIG. 7 is a fragmentary side elevational view showing another embodiment of the apparatus of the invention wherein a continuous web of flexible material is used.
Figure 8:
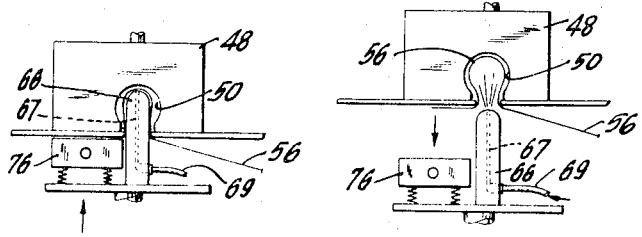
FIGS. 8 and 9 are enlarged fragmentary views of the loop forming means of FIG. 3 showing one means for completing and holding loop formation.
Figure 9:
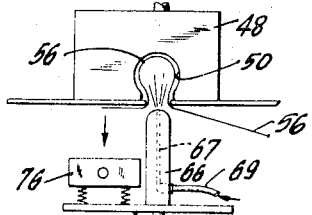

In another embodiment of the inventive process, illustrated in FIG. 7, the magazine means 16 is substituted by a spool of a continuous web of a flexible material 88, which revolves around, and is supported by, axle 90. This continuous web of flexible material is fed into an aperture cutting means immediately prior to being positioned on table 107. This aperture cutting means comprises a cylinder 92 which is sequentially timed by timing device 74 by electrical means not shown. Cylinder 92 actuates piston 94 to which is affixed an aperture cutting die 96. When piston 94 is extended by cylinder 92 the cutting die 96 contacts the continuous web of flexible material forming apertures therein which are of the same general configuration, but slightly smaller than the outline of the items being display packaged.

In this embodiment cutting means 86 is attached to sever both the continuous web of flexible material and the continuous web of the transparent film, thus resulting in individual display units. If desired, cutting means 86 may be a shaped punch so as to form the flexible material package into any design desired.

It is to be understood, of course, that the above description relates to one specific embodiment of the invention and that many variations are possible within the inventive concept. For example, the actuating cylinders 26, 52, 62, and 82 may be operated by hydraulic fluid or air pressure, as desired, or by any other mechanical means. The timing mechanism is not shown in specific detail, since these principles are well known in the art.

Referring to FIGS. 10 and 11, there is shown a tape or web 100 of material, such as film, paper, foil or the like, which is fed from a roll, not shown, under tension through an aperture 66a in the loop forming plunger 66 over a stationary guide plate 101 where it makes contact with the transparent film 56 on the back side of the flexible material 102. If the web of material is to be heat sealed to the transparent film 56 it should be compatible or coated to make it sealable. If the seb of material is to be affixed by other means, such coating is unnecessary.

The web of material is sealed to the transparent film 56 at the same time as the transparent film is sealed to the back side of the flexible material 102, as heretofore described. In my copending application Ser. No. 246,266, filed Apr. 21, 1972, which is also a continuation-in-part of my application Ser. No. 862,586, filed Aug. 25, 1969 (U.S. Pat. No. 3,657,855) I have described and claimed the completed package with the film 56 and web of material 100 secured to the back side of the flexible material 102. Such web of material 100 can be of the same width as the film 56 or can be narrower or wider depending on the article packaged. Such web of material serves to further secure the article to the sheet of flexible material and prevent the article from being forced out of the back of the aperture.

FIG. 13 shows a modified path for feeding the web of material 100 to the transparent film 56. Instead of feeding the web through the loop forming plug 66, the web is fed through an aperture 103a in the base plate 103 which supports the plunger 66 and platen 76. The web comes up adjacent the plunger 66 to the guide plate 101 where it meets the transparent film 56. It is here secured to the film as heretofore described.

In my copending application Ser. No. 862,586 now U.S. Pat. No. 3,657,855, referred to above, there is shown one means for using a jet of air to cause the loop of transparent film to conform to die cavity 50. In the present application another means is shown in FIG. 10 and 12. A pair of air jets 105 are positioned on each side of the cavity 50 at the bottom opening and in the center as shown in FIG. 12. Such jets are connected to a compressed air source not shown. A timed burst of air is blown from each jet lengthwise of the cavity. Such bursts of air are blown out of each end of the cavity and thus create a vacuum in the cavity, which vacuum draws the film against the side walls of the cavity to round out the loop and facilitate the insertion of the article.

In addition there is a shaper 104 which drops down by gravity to assist the formation of the loop. Such shaper 104 is affixed to the shaft 104a which passes through the die 48. At the top end of the shaft there is a stop 104b which limits how far the shaper can drop.

In operation the plunger projects through the aperture of the flexible material into the cavity thereby pushing the film upward with the plunger. The plunger forms the film into an elongated loop. As the plunger retracts the shaper drops downward against the top of the loop and rounds it out. At the same time the air bursts from the jets are turned on to complete the formation of the loop into a rounded shape ready to receive the article.

It will also be appreciated that other modifications of the invention will be apparent to those skilled in the art. For example, the width of the transparent film making up the loop for holding the items on the display device may be varied to suit the particular object being held in position. This loop may be adapted to fit objects of any shape and to cover or extend over any portion of the device desired.

Although the transparent film is particularly satisfactory because it permits viewing the article through the film and any printing which may be on the article, it should be understood that other materials, such as paper, foil, opaque film and the like may be substituted for the transparent film. In such case it may be necessary to print directly on the material rather than depend on the printing on the article.

It is also to be noted that the position of the aperture with respect to the flexible material may be varied at will. In the embodiment shown the aperture is positioned near the center of the sheet of flexible material; however, it may be at the bottom edge thereof and the base of the article fastened therein may form a supporting structure for an upright display of the display device.

Although it is contemplated by the preferred embodiment of this invention that the aperture in the sheet of flexible material should conform generally to the outline of the article being displayed, although being of a slightly smaller dimension than the outline of the article. It is readily apparent that an aperture of a size sufficient to extend the required width of the transparent film therethrough will be sufficient and the aperture need not necessarily conform to the articles outlined.

Other and further embodiments of the inventive concept may be adapted without departing from the concept of the invention.

To reiterate briefly, the instant invention relates to a new display article and a process and apparatus for its manufacture. The device comprises a card of a flexible material containing displayed thereon at least one item which fits into an aperture which conforms to the outline of the article but is smaller than the outline. A loop of flexible film extends through the aperture and around the item and is fastened to the back of the flexible material, thus securely holding the item on the display card. The loop has been tightened about the item by mechanical means as the sequential cycles operate. Another web, of suitable material (100) is affixed to the back of the film material to further secure the article to the sheet of flexible material and prevent backward movement of the article through the aperture.

What is claimed is:

1. A process for automatically packaging articles for display which comprises the steps of:
    passing a web of first material along one side of a sized apertured flexible material, the width of said first material being less than the greatest dimension of the aperture in said flexible material;
    forming a loop of said first material through the aperture in said flexible material;
    positioning an article within said loop so that it conforms generally to the outline of said aperture;
    tightening said loop about the article to hold it firmly in the sized aperture in said flexible material by mechanical movement of said flexible material;
    affixing said first material to said flexible material on each side of said sized aperture therein, and
    securing a web of second material over the said first material and the said article on the said one side of the said flexible material.

2. A process for automatically packaging articles for display which comprises the steps of:

passing a web of first material along one side of a sized apertured flexible material, the width of said first material being less than the greatest dimension of the aperture in said flexible material;

forming a loop of said first material through the aperture in said flexible material into a die cavity, blowing air pressure lengthwise of the cavity from the center area of the said cavity and adjacent the lower opening of said cavity to assist in shaping the loop;

positioning an article within said loop so that it conforms generally to the outline of said aperture;

tightening said loop about the article to hold it firmly in the sized aperture in said flexible material by mechanical movement of said flexible material, and affixing said first material to said flexible material on each side of said sized aperture therein.

3. An apparatus for the manufacture of display cards of shaped articles which comprises:

a table adapted to support and guide a display card thereon and having an aperture therein;

means for feeding a continuous web of a first material across the underside of said table;

movable loop-forming means adapted to extend upwardly through said aperture to form a loop from the said first material positioned across the underside of said aperture;

a movable die having a cavity adapted to be sequentially positioned above said aperture and to receive said loop-forming means;

movable positioning means adapted to position an article within said die and said loop of first material when said die is positioned above said aperture;

means to sequentially advance an apertured display card into registration with said aperture in said table and to tighten by such advance said loop of first material about said article positioned in said loop;

means for affixing the web of first material to the underside of said display card, and means for feeding and securing a web of second material over the said first material and the said article on the underside to prevent backward movement of the article through the aperture.

4. An apparatus according to claim 3 wherein said loop forming means comprises a plunger and the web of second material is fed through the said plunger to the said first material.

5. An apparatus according to claim 3 wherein said loop forming means comprises a plunger and the web of second material is fed adjacent the said plunger to the said first material.

6. An apparatus for the manufacture of display cards of shaped articles which comprises:

a table adapted to support and guide a display card thereon and having an aperture therein;

means for feeding a continuous web of a first material across the underside of said table;

movable loop-forming means adapted to extend upwardly through said aperture to form a loop from the said first material positioned across the underside of said aperture;

a movable die having a cavity adapted to be sequentially positioned above said aperture and to receive said loop-forming means.

movable positioning means adapted to position an article within said die and said loop of first material when said die is positioned above said aperture;

means to sequentially advance an apertured display card into registration with said aperture in said table and to tighten by such advance said loop of first material about said article positioned in said loop;

means for affixing the web of first material to the underside of said display card, and air pressure means for forming said loop comprising air jets positioned at the center area on each side of the cavity and adjacent the lower opening of the cavity, which jets are adapted to be connected to a source of compressed air to give off bursts of air flow lengthwise of the cavity to assist in shaping the loop.

7. An apparatus for the continuous automatic manufacture of display cards of shaped articles which comprises;

a table having an aperture therein and adapted to support and guide a web of semi-flexible material having spaced apertures therein;

means for feeding a continuous web of a first material across the underside of said table;

movable loop-forming means adapted to extend upwardly through said table aperture and to form a loop from the first material positioned across the underside of said table aperture;

a movable die having a cavity adapted to be sequentially positioned above said table aperture and to receive said loop-forming means;

movable positioning means adapted to position an article within said die and said loop of first material when said die is positioned above said table aperture;

means to sequentially advance the apertured semi-flexible material into registration with said aperture in said table and to tighten by such advance said loop of first material about said article positioned in said loop;

means for affixing the web of first material to the underside of said semi-flexible material;

means for feeding a continuous web of a second material to contact the first material and to affix the second web to the first web, and means for severing the webs of material into display cards.

* * * * *